United States Patent
Reubeuze et al.

(10) Patent No.: US 6,554,361 B2
(45) Date of Patent: Apr. 29, 2003

(54) HINGE MECHANISM FOR A VEHICLE SEAT, AND A SEAT INCLUDING SUCH A MECHANISM

(75) Inventors: Yann Reubeuze, Landigou (FR); François Cilliere, La Selle la Forge (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 14 days.

(21) Appl. No.: 09/982,185

(22) Filed: Oct. 17, 2001

(65) Prior Publication Data

US 2002/0053825 A1 May 9, 2002

(30) Foreign Application Priority Data

Oct. 19, 2000 (FR) .............................. 00 13414

(51) Int. Cl.$^7$ ................................. B60N 2/22
(52) U.S. Cl. ...................... 297/367; 297/366
(58) Field of Search ............... 297/367, 366, 297/368, 369

(56) References Cited

U.S. PATENT DOCUMENTS

| 4,770,464 A | * | 9/1988 | Pipon et al. ................ 297/367 |
| 5,681,086 A | | 10/1997 | Baloche ..................... 297/367 |
| 5,984,413 A | | 11/1999 | Baloche et al. ............. 297/367 |
| 6,082,821 A | * | 7/2000 | Baloche et al. ........ 297/354.12 |
| 6,092,874 A | * | 7/2000 | Kojima et al. .............. 297/367 |
| 6,318,805 B1 | * | 11/2001 | Asano ......................... 297/367 |
| 6,328,383 B2 | * | 12/2001 | Rohee et al. ............... 297/367 |

FOREIGN PATENT DOCUMENTS

| EP | 0 720 930 | 7/1996 |
| FR | 2 626 154 | 7/1989 |
| FR | 2 770 469 | 5/1999 |
| FR | 2 790 230 | 9/2000 |

OTHER PUBLICATIONS

Rohee et al., patent application Publication No. US 2001/0001220 A1, Publ. Date: May 17, 2001.
Preliminary Search Report dated Jul. 6, 2001, Appl. No. FR 0013414.

* cited by examiner

Primary Examiner—Anthony D. Barfield
(74) Attorney, Agent, or Firm—McCracken & Frank

(57) ABSTRACT

A hinge mechanism comprising a fixed cheek plate, a moving cheek plate provided with a circular set of teeth, two toothed slugs disposed at 120° relative to each other, which slugs are slidable relative to the fixed cheek plate and are adapted to co-operate with the circular set of teeth in order to lock the moving cheek plate, a cam for controlling radial displacement of the slugs, and two abutments belonging to the fixed cheek plate, each plate facing the rear end of a corresponding one of the slugs and serving as a bearing surface for the cam.

9 Claims, 4 Drawing Sheets

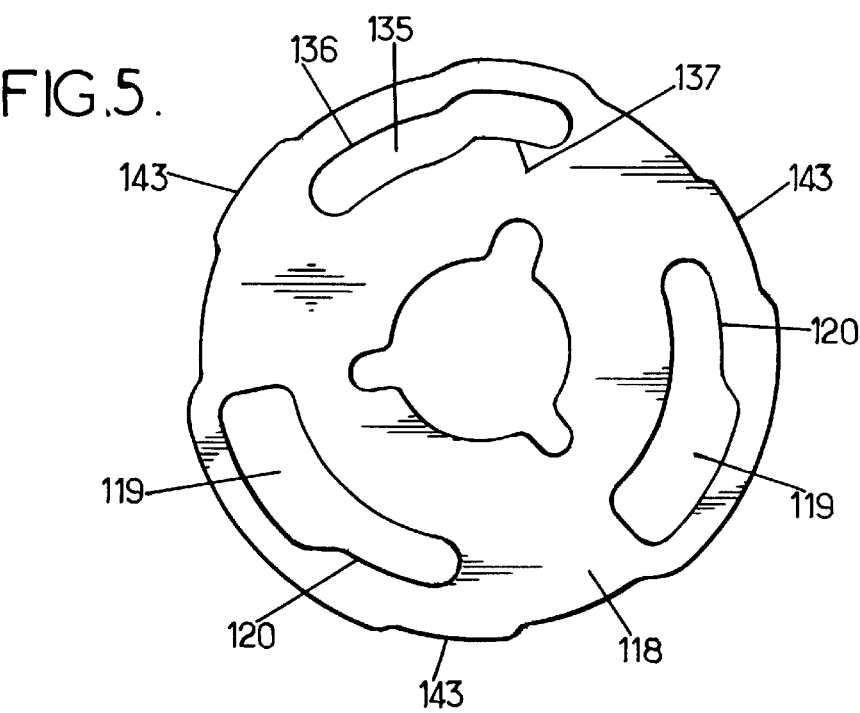
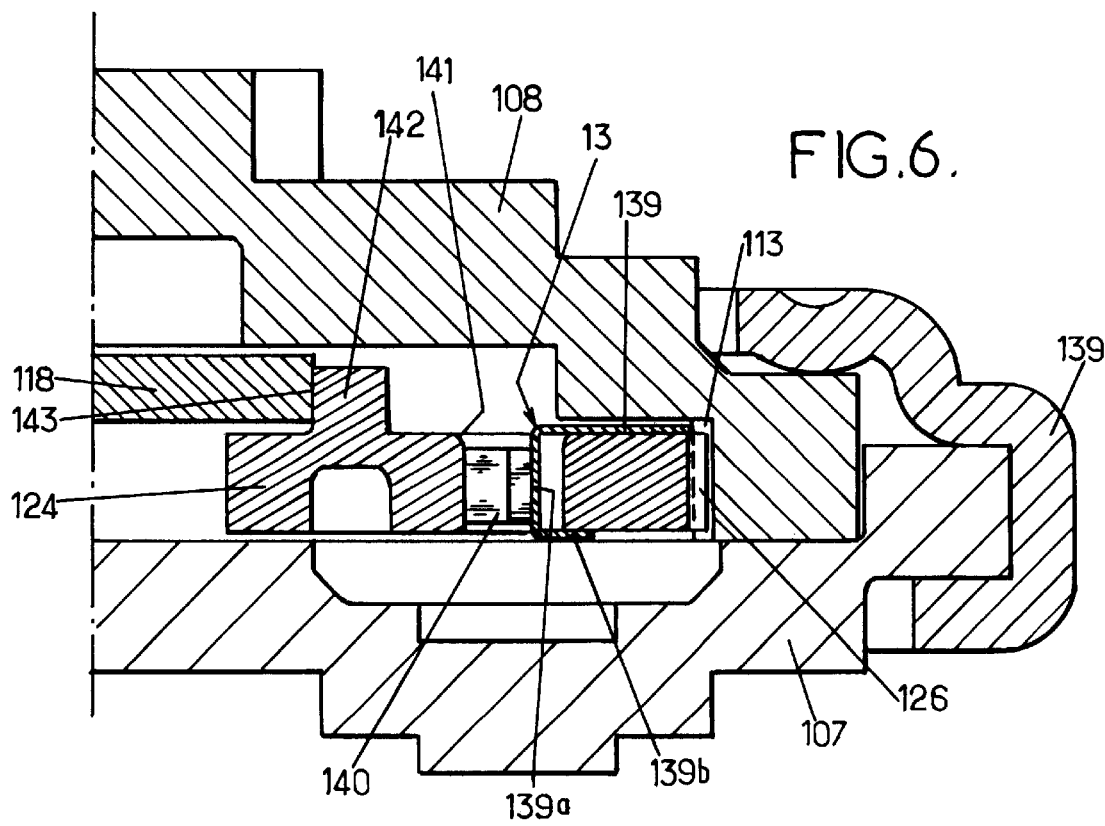

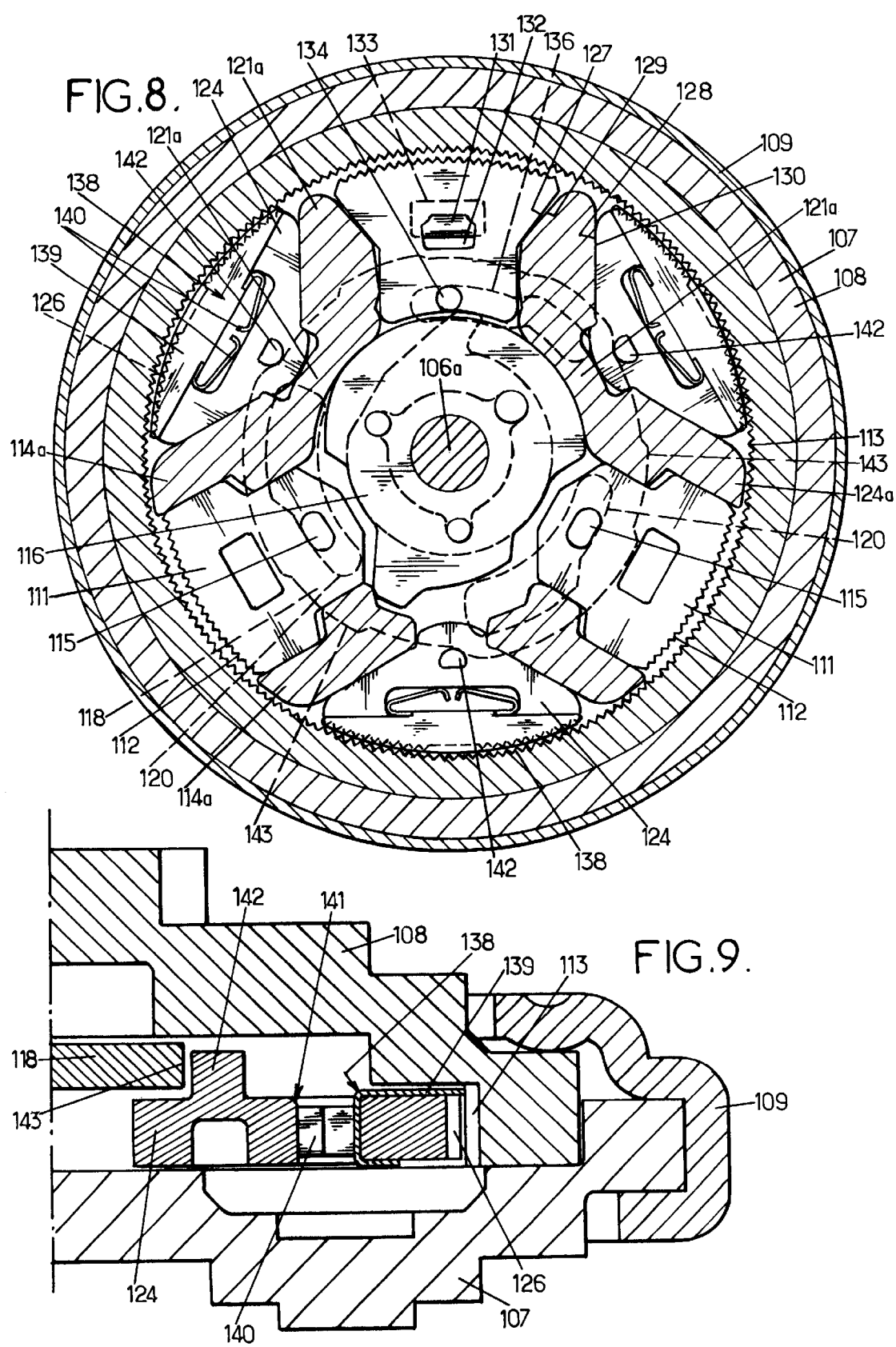

HINGE MECHANISM FOR A VEHICLE SEAT, AND A SEAT INCLUDING SUCH A MECHANISM

FIELD OF THE INVENTION

The present invention relates to hinge mechanisms for vehicle seats, and to seats including such mechanisms.

More particularly the invention relates to a hinge mechanism for a vehicle seat for interconnecting two elements forming parts of the seat and mounted to pivot relative to each other about a pivot axis, said hinge mechanism comprising:

first and second cheek plates for securing respectively to the two seat elements, said cheek plates being mounted to pivot relative to each other about said pivot axis, the second cheek plate being permanently secured to a set of teeth extending over at least an arc of a circle centered on the axis of rotation;

a plurality of locking slugs each provided with a set of teeth suitable for co-operating with the teeth of the second cheek plate, each locking slug being movable relative to the first cheek plate between firstly an engagement position in which the teeth of the locking slug co-operate with the teeth of the second cheek plate to lock the hinge mechanism, and secondly a retracted position in which the locking slug does not co-operate with said teeth of the second cheek plate; and a cam mounted to pivot about the pivot axis and urged resiliently towards a rest angular position, said cam presenting a peripheral edge cut out in such a manner as to bear against the locking slugs, placing said locking slugs in their engagement position when the cam is in its rest position, and the cam being movable by a user into an actuation angular position in which said cam enables the locking slugs to move towards their retracted positions, and disengagement means adapted to place the locking slugs in their retracted positions when the cam is in its actuation position.

The above-mentioned disengagement means can be constituted, in particular, by a control plate turning with the cam and provided with camming edges that cooperate with the locking slugs. The disengagement means could optionally also be constituted by one or more springs, or possibly merely by the shape of the teeth of the second cheek plate and of the locking slugs, which shape would then be adapted to cause the slugs to slide radially inwards as soon as the two cheek plates start to turn relative to each other while the cam is in its actuation position.

BACKGROUND OF THE INVENTION

Document EP-A-0 720 930 describes an example of such a hinge mechanism intended to enable the angular position of the seat back to be adjusted relative to the seat proper. That hinge mechanism has three locking slugs that are angularly distributed at 120° relative to one another.

OBJECTS AND SUMMARY OF THE INVENTION

The hinge mechanism described in that document gives entire satisfaction, however the inventors of the present invention have set out to improve it further, so as to make it lighter in weight and less expensive, or so as to make it stronger at comparable weight and cost.

To this end, the invention provides a hinge mechanism of the kind in question that is characterized in that there are two locking slugs, and in that said locking mechanism further comprises at least two abutment zones which are fixed relative to the first cheek plate and which face substantially radially towards the central pivot axis and towards the two locking slugs respectively, the peripheral edge of the cam being shaped so as to bear radially against said abutment zones when the cam is in its rest position, the two locking slugs being placed on one side of a diametral line intersecting the pivot axis, and the two abutment zones being placed on the opposite side of said diametral line.

By means of these dispositions, a hinge mechanism is obtained which, when it includes only the two locking slugs for locking the two cheek plates relative to each other, presents braking strength comparable to prior art mechanisms having three slugs, while nevertheless being lighter in weight and less expensive since one of the slugs is omitted. The strength of the mechanism of the invention is due to the presence of the two abutment zones which take up the forces tending to move the locking slugs in reverse when a large torque is applied between the first and second cheek plates, in particular in the event of a traffic accident. In particular, because the abutment zones are disposed substantially in an open V-shape looking towards the locking slugs, the cam is in stable equilibrium and therefore does not tend to escape from said abutment zones when the hinge is subjected to a large torque.

Furthermore, the internal arrangement of the hinge mechanism of the invention releases a fraction of the inside space between the first and second cheek plates, and advantage can be made of this space to add additional functions to the hinge mechanism.

In particular, this empty space can be used for adding one of the following to the hinge mechanism:

a device for memorizing an angular position, similar to the device described in document FR-A-2 770 469 for example, so as to enable the back of a vehicle seat to be folded down in order to give access to rear seats of the vehicle, and then return the back to its initial angular position; or a jamming device similar to that described in document FR-A-2 790 230, or indeed a jamming device of the kind described below.

In preferred embodiments of the invention, use can optionally also be made of one or more of the following dispositions:

the two abutment zones present circularly-arcuate shapes centered on the pivot axis, and the peripheral edge of the cam itself presents two circularly-arcuate portions centered on the pivot axis and coming into contact with each of the abutment zones respectively, at least when the cam is in the rest position;

said two circularly-arcuate portions of the peripheral edge of the cam have the same radius and form portions of the same circularly-arcuate sector belonging to said peripheral edge;

the two abutment zones are disposed substantially at 120° to each other about the pivot axis, and the two locking slugs are likewise disposed at substantially 120° to each other about the pivot axis;

the mechanism includes at least one jamming member of a shape that diverges going radially towards the teeth of the second cheek plate, and including a set of teeth facing said teeth of the second cheek plate, said jamming member being mounted on the first cheek plate in such a manner that its teeth come into engagement with the teeth of the second cheek plate at least when the hinge mechanism is subjected to a torque that is greater than a predetermined value, the first cheek plate including at least one guide adapted under such circumstances to cooperate with a side bearing edge belonging to the jamming member and urging said jamming member by a wedging effect against the teeth of the second cheek plate;

the hinge mechanism has four jamming members, one of the jamming members being placed between the two locking slugs on one side of said diametral line and the other jamming members being placed on the other side of said diametral line, opposite the locking slugs;

the guides corresponding to said three other jamming members are formed by two portions in relief fixed relative to the first cheek plate, said two portions in relief also forming said two abutment zones; and the cam is urged resiliently by a single spiral spring which is placed in a central housing formed in the first cheek plate, said spring extending between a first end connected to the first cheek plate and a second end connected to the cam.

The invention also provides a vehicle seat comprising a seat proper and a seat back interconnected by at least one hinge mechanism as defined above.

BRIEF DESCRIPTION OF THE DRAWINGS

Other characteristics and advantages of the invention appear from the following description of an embodiment thereof, given by way of non-limiting example and with reference to the accompanying drawings.

In the drawings:

FIGS. 4 and 5 are detail views showing respectively the central spring and the control tab of the mechanism of FIGS. 2 and 3;

FIG. 6 is a detail view in section on line VI—VI of FIG. 3 through one of the locking slugs of the mechanism of FIGS. 2 and 3;

FIGS. 8 and 9 are respectively similar to FIGS. 3 and 6, showing the hinge mechanism in its actuation position.

MORE DETAILED DESCRIPTION

In the various figures, the same references are used to designate elements that are identical or similar.

Figure 1:
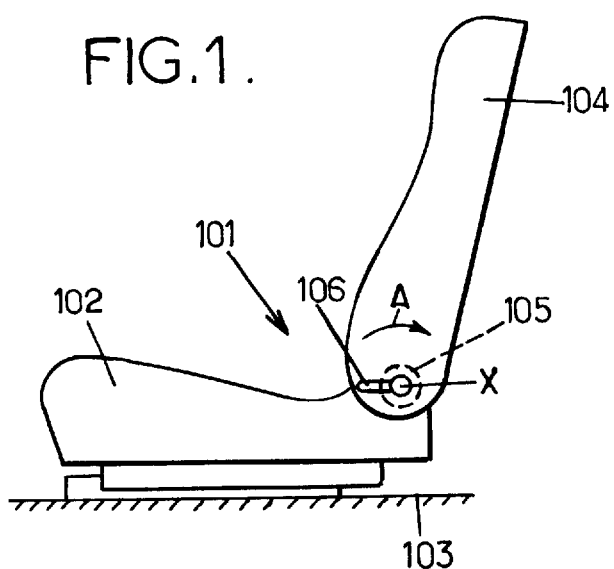
FIG. 1 is a diagrammatic view of a seat whose back is adjustable in inclination by means of at least one hinge mechanism of the invention.

As shown diagrammatically in FIG. 1, the invention relates to a vehicle seat 101, in particular a motor vehicle front seat, and comprising firstly a seat proper 102 mounted on the floor 103 of the vehicle and secondly a back 104 pivotally mounted on the seat proper 102 about the transverse horizontal axis X.

More precisely, the rigid frame of the back is connected to the rigid frame of the seat proper via a hinge mechanism 105 controlled by a handle 106 mounted to pivot about the transverse horizontal axis X. The frame of the back could optionally be connected to the seat proper via two hinge mechanisms 105 that are identical or similar, being placed on either side of the seat, and both being under control of said handle 106.

Turning the handle 106 in angular direction A shown in FIG. 1 serves to unlock the hinge mechanism 105 enabling the user of the seat to adjust the inclination of the back 104 by acting directly on the back, said back generally being urged forwards by at least one spring (not shown).

Figure 2:
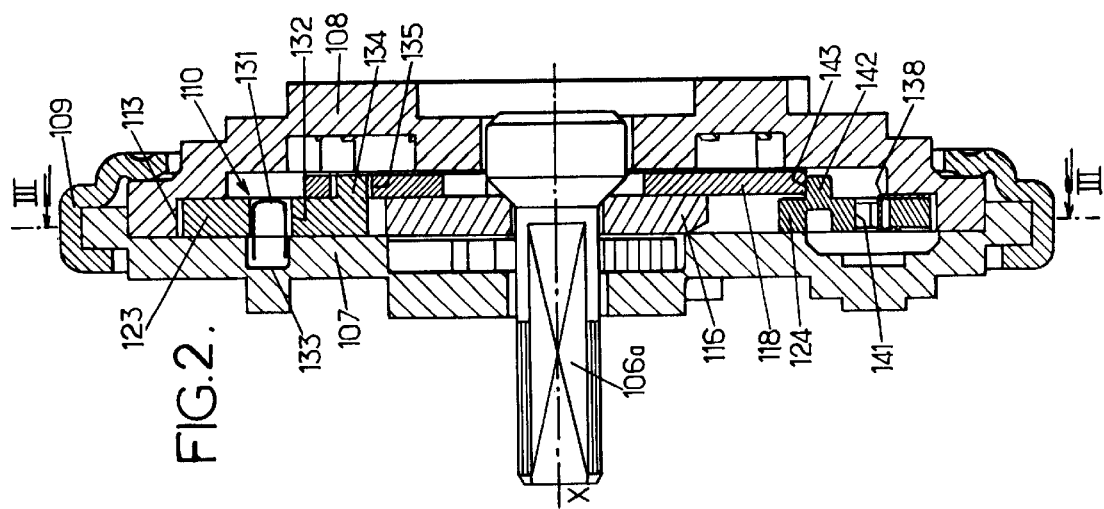
FIGS. 2 and 3 are section views of a mechanism constituting an embodiment of the invention and suitable for fitting to the seat of FIG. 1, these sections showing the hinge mechanism in its rest position and being taken respectively on line II—II of FIG. 3 and on line III—III of FIG. 2 (the slugs and the cam of the hinge mechanism are shown as though not in section for greater clarity, and the control plate of the mechanism, situated above the section plane, is represented by dashed lines)
Figure 3:
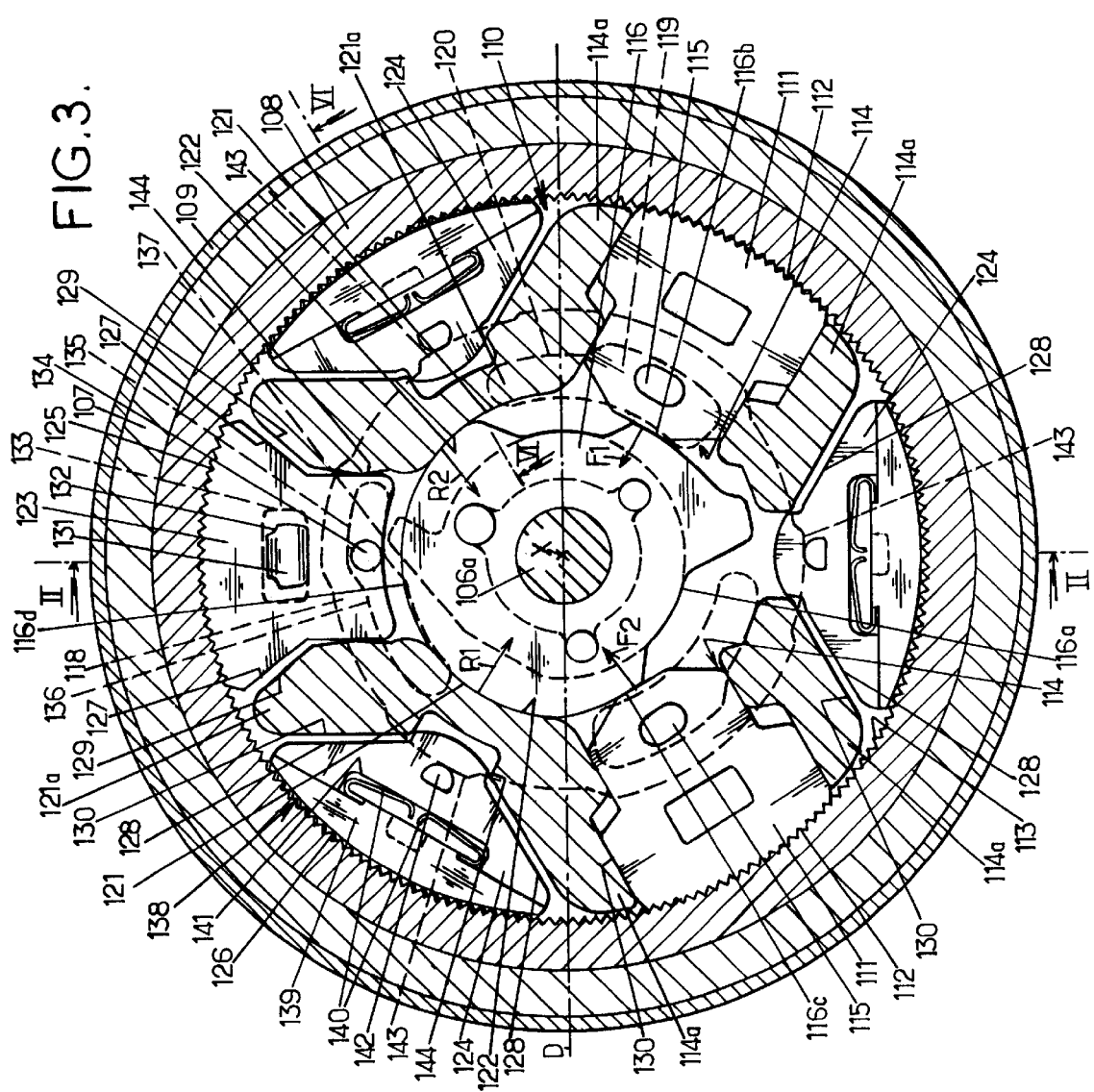

As shown in FIGS. 2 and 3, the hinge mechanism 105 comprises:

a fixed metal cheek plate 107 which extends perpendicularly to the axis X and which can be secured to the rigid framework of the seat proper, for example;

a moving metal cheek plate 108 which likewise extends perpendicularly to the axis X and which can be secured to the framework of the back, for example, the cheek plate 108 having an outer ring 108a which is surrounded by an outer ring 107a belonging to the cheek plate 107;

a metal ring 109 is crimped around the periphery of the fixed and moving cheek plates 107 and 108, cooperating therewith to define a closed circular box; and a locking device 110 with slugs contained in said box and adapted to prevent the moving cheek plate 108 from moving relative to the fixed cheek plate 107 so long as the handle 106 is in the rest position.

Figure 4:
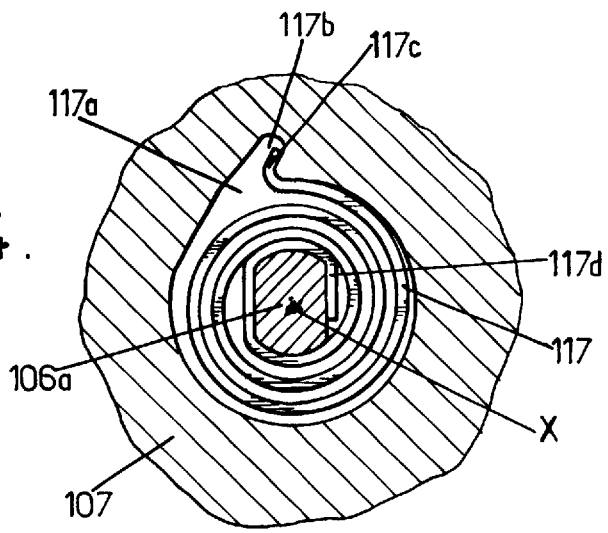

The locking device 110 comprises:

two metal locking slugs 111 which are disposed at 120° to each other about the axis X, and each of which has a set 12 of outwardly directed teeth adapted to engage with a circular set 113 of inwardly directed teeth formed in the moving cheek plate 108, each slug being mounted to slide radially in a guide 114 which is fixed relative to the fixed cheek plate 107 (by way of example the guide 114 can be in the form of two half-cutouts or stampings 114a formed in the fixed cheek plate), so that the locking slugs can be moved between firstly an engaged position in which the teeth 112 of the slug are in engagement with the teeth 113 of the moving cheek plate so as to lock the hinge mechanism 105, and secondly a retracted position in which the slugs 111 do not cooperate with the teeth 113 of the moving cheek plate, each slug also including at least one rear peg 115 which projects axially towards the moving cheek plate 108;

a metal cam 116 which is secured to the handle 106 via a control shaft 106a, the cam possessing a peripheral edge 116a having two projecting camming edges 116b, 116c adapted to bear against the rear ends of the locking slugs 111, camming edge 116c being extended angularly, remote from the locking slugs 111, by a circularly-arcuate sector 116d of constant radius;

a spiral spring 117 (see FIG. 4) which is mounted in a housing 117a stamped in the fixed cheek plate 107 and which urges the cam 116 towards a rest position in which the camming edges 116b, 116c place the slugs 111 in the engaged position, said cam being suitable for pivoting in angular direction A under drive from the handle 106 to take up an actuation angular position so as to enable the slugs 111 to slide towards the retracted position, thereby unlocking the hinge mechanism 105 (advantageously the housing 117a which receives the spring 117 can include a notch 117b in which a folded end 117c of the spiral spring 117 is retained, while the other end 117d of the spiral spring is clamped around a portion of the control shaft 106a which is formed with two side flats); and a rigid metal control plate 118 (see FIGS. 3 and 5) which is fixedly engaged on the cam 116 and which extends radially between said cam and the moving cheek plate 108, partially overlying the slugs 111, said control plate having two cutouts 119 in which the pegs 115 of the locking slugs are engaged, each of the pegs co-operating with a camming edge 120 in the form of a ramp defined by the corresponding cutout 119 on the radially outer side thereof and shaped so as to move the corresponding slug 111 radially inwards when the cam 116 turns in the angular direction A.

In order to increase the mechanical strength of the hinge 105 so as to increase its ability to withstand the pivoting torques that might be applied thereto, in particular in the event of the vehicle in which the seat is installed suffering an accident, the fixed cheek plate 107 also has two abutment zones 121 (see FIG. 3) which are preferably formed by two half-cutouts or stampings 121a formed in said cheek plate.

These abutment zones 121 are advantageously in the form of circularly-arcuate edges centered on the axis X, having the same radius as the circular sector 116d of the cam, with the circular sector 116d being in sliding contact with said abutment zones 121.

The two abutment zones 121 face radially towards the axis X and they are both disposed on one side of a diametral line D, with the locking slugs 111 being placed on the opposite side of said diametral line relative to the abutment zones 121 such that each abutment zone 121 faces towards the rear of one of the locking slugs 111.

Thus, when a torque is applied between the fixed and moving cheek plates 107, 108 of the hinge mechanism, the forces F1 and F2 tending to reverse the two locking slugs 111 are taken up by the cam 116, and they are compensated by reaction forces R1 and R2 exerted by the abutment zones 121 on the corresponding portions 122 of the circular sector 116d of the cam. Given the disposition of the abutment zones 121 in an open V configuration looking towards the two slugs 111, the cam 116 is in a stable equilibrium position under the effects of the various forces F1, F2, R1, R2, thereby further improving the mechanical strength of the assembly and ensuring that the locking slugs 111 do not reverse even when very high torques are applied between the two cheek plates 107 and 108.

Furthermore, the control device 110 also includes four additional rigid metal slugs 123, 124 referred to as jamming slugs (see FIGS. 2 and 3). One of these jamming slugs 124 is located between the two locking slugs 111 on one side of the above-mentioned diametral line D, while the other two jamming slugs 124 and the jamming slug 123 are placed on the other side of said diametral line D, the jamming slug 123 being placed between said other two jamming slugs 124.

Each of the jamming slugs 123, 124 has a set of teeth 125, 126 directed radially outwards and adapted to engage with the inwardly directed teeth 113 of the moving cheek plate 108. In addition, each of the slugs 123, 124 is mounted to slide radially in a guide that is fixed relative to the fixed cheek plate 107, so that each of said jamming slugs 123, 124 can be moved between:

firstly an active position in which the teeth 125, 126 of the slug are engaged with the teeth 113 of the moving cheek plate (FIGS. 2, 3, and 6); and secondly a retracted position in which the slug 123, 124 does not co-operate with the teeth 113 of the moving cheek plate (FIGS. 8 and 9).

The guides for the various jamming slugs 123, 124 are constituted by half-cutouts or stampings formed in the fixed cheek plate 107. In particular, the jamming slug 124 that is placed between the two locking slugs 111 is guided between two of the stampings 114a that also serves to guide the locking slugs 111, while the other three jamming slugs 123, 124 are guided by the above-mentioned stampings 121a, said stampings 121a also defining respective ones of the two guides 114a for each of the locking slugs 111.

Advantageously, each jamming slug 123, 124 is normally in contact with only a small region of each of the guides 114a, 121a, thus leaving the slugs 123, 124 with a certain amount of angular play in addition to their ability to slide radially.

Each of the jamming slugs 123, 124 diverges radially outwards and thus has two diverging side edges 127, 128 facing corresponding bearing edges 129, 130 that are formed by the guides 114a, 121a and that diverge outwards.

As shown in FIGS. 2 and 3, the jamming slug 123 is urged resiliently towards its active position, e.g. by means of a spring 131 such as a spring blade that is folded substantially into a U-shape, passing through a housing 132 formed in the slug 123 and penetrating into a housing 133 formed in the fixed cheek plate 107.

In addition, the slug 123 has a peg 134 which projects axially towards the moving cheek plate 108 and which penetrates into a cutout 135 formed in the control plate 118. This cutout 135 has an outside edge 136 in the form of a ramp which is adapted to cause the jamming slug 123 to slide radially inwards when the cam 116 is in the actuation position, and an inside edge 137 in the form of a ramp which is adapted to bear against the peg 134 and hold the jamming slug 123 in the active position while the cam 116 is in the rest position.

Figure 7:
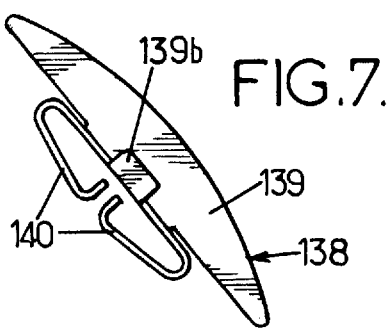
FIG. 7 is a view from beneath of a spring blade fitted to the locking slug of FIG. 6.

Furthermore, each jamming slug 124 is provided with a respective metal spring blade 138 (see FIGS. 6 and 7) which comprises firstly a bearing plate 139 covering the front portion of the jamming slug 124 and bearing against the teeth 113 of the moving cheek plate 108, and secondly two resilient tabs 148 folded from the bearing plate 139 and penetrating into a housing 141 formed in the jamming slug 124. The resilient tabs 140 urge the jamming slug 124 resiliently towards its retracted position (FIGS. 8 and 9).

Advantageously, the plate 139 and the spring blade are extended towards the fixed cheek plate 107 by a flap 139a which penetrates into the housing 141 of the jamming slug 124. This flap 139a is itself extended radially outwards by a tab 139b which passes beneath the slug 124 and which guarantees that the spring blade 138 is properly positioned relative to the slug 124.

Each jamming slug 124 also has a peg 142 which projects axially towards the moving cheek plate 108, and the outer peripheral edge of the control plate 118 has bearing edges 143 adapted to bear against the pegs 142 so as to compress the resilient tabs 140 and move the jamming slugs 124 into their active positions when the cam 116 is in the actuation position (FIGS. 2, 3, and 6).

While the hinge mechanism 105 is in normal use, the jamming slugs 123, 124 produce substantially no effect.

In contrast, when a particularly high pivot torque (e.g. greater than 100 meter-decanewtons (m.daN)) is applied between the fixed and moving cheek plates 107, 108, in particular due to a traffic accident suffered by the vehicle in which the seat is installed, then the locking slugs 111 begin to deform their guides 114 so that the moving plate 108 begins to pivot. As soon as this pivoting has reached an amplitude (e.g. about 2 degrees) that is sufficient to take up the clearance that exists between the jamming slugs 123, 124 and their guides 114a, 121a, said jamming slugs 123, 124 become pressed strongly against the teeth 113 of the moving cheek plate by a wedging effect between one of the side edges 127, 128 of each of the slugs and the corresponding bearing edge 129, 130. Given this wedging effect, the mechanical strength of the hinge 105 is further increased, and to a considerable extent.

It should also be observed that instead of using the jamming slugs 123, 124 to occupy the spaces left empty in the hinge mechanism by the locking slugs 111, said spaces could also be occupied by a jamming device similar to that described in document FR-A-2 790 230 and/or by a memory device similar to that described in document FR-A-2 770 469, for example.

We claim:

1. A hinge mechanism for a vehicle seat for interconnecting two elements forming parts of the seat and mounted to pivot relative to each other about a pivot axis, said hinge mechanism comprising:

first and second cheek plates for securing respectively to the two seat elements, said cheek plates being mounted to pivot relative to each other about said pivot axis, the second cheek plate being permanently secured to a set of teeth extending over at least an arc of a circle centered on the axis of rotation a plurality of locking slugs each provided with a set of teeth suitable for co-operating with the teeth of the second cheek plate, each locking slug being movable relative to the first cheek plate between firstly an engagement position in which the teeth of the locking slug co-operate with the teeth of the second cheek plate to lock the hinge mechanism, and secondly a retracted position in which the locking slug does not co-operate with said teeth of the second cheek plate; and a cam mounted to pivot about the pivot axis and urged resiliently towards a rest angular position, said cam presenting a peripheral edge cut out in such a manner as to bear against the locking slugs, placing said locking slugs in their engagement position when the cam is in its rest position, and the cam being movable by a user into an actuation angular position in which said cam enables the locking slugs to move towards their retracted positions, and disengagement means adapted to place the locking slugs in their retracted positions when the cam is in its actuation position, wherein there are two locking slugs, and said locking mechanism further comprises at least two abutment zones which are fixed relative to the first cheek plate and which face substantially radially towards the central pivot axis and towards the two locking slugs respectively, the peripheral edge of the cam being shaped so as to bear radially against said abutment zones when the cam is in its rest position, the two locking slugs being placed on one side of a diametral line intersecting the pivot axis, and the two abutment zones being placed on the opposite side of said diametral line.

2. A hinge mechanism according to claim 1, in which the two abutment zones present circularly-arcuate shapes centered on the pivot axis, and the peripheral edge of the cam itself presents two circularly-arcuate portions centered on the pivot axis and coming into contact with each of the abutment zones respectively, at least when the cam is in the rest position.

3. A hinge mechanism according to claim 2, in which said two circularly-arcuate portions of the peripheral edge of the cam have the same radius and form portions of the same circularly-arcuate sector belonging to said peripheral edge.

4. A hinge mechanism according to claim 1, in which the two abutment zones are disposed substantially at 120° to each other about the pivot axis, and the two locking slugs are likewise disposed at substantially 120° to each other about the pivot axis.

5. A hinge mechanism according to claim 1, further including at least one jamming member of a shape that diverges going radially towards the teeth of the second cheek plate, and including a set of teeth facing said teeth of the second cheek plate, said jamming member being mounted on the first cheek plate in such a manner that the teeth of said jamming member come into engagement with the teeth of the second cheek plate at least when the hinge mechanism is subjected to a torque that is greater than a predetermined value, the first cheek plate including at least one guide adapted under such circumstances to co-operate with a side bearing edge belonging to the jamming member and urging said jamming member by a wedging effect against the teeth of the second cheek plate.

6. A hinge mechanism according to claim 5, having four jamming members, one of the jamming members being placed between the two locking slugs on one side of said diametral line and the other jamming members being placed on the other side of said diametral line, opposite the locking slugs.

7. A hinge mechanism according to claim 6, in which the guides corresponding to said three other jamming members are formed by two portions in relief fixed relative to the first cheek plate, said two portions in relief also forming said two abutment zones.

8. A hinge mechanism according to claim 1, in which the cam is urged resiliently by a single spiral spring which is placed in a central housing formed in the first cheek plate, said spring extending between a first end connected to the first cheek plate and a second end connected to the cam.

9. A vehicle seat comprising a seat proper and a seat back interconnected by at least one hinge mechanism according to claim 1.

* * * * *